US005348085A

United States Patent [19]
Benson

[11] Patent Number: 5,348,085
[45] Date of Patent: Sep. 20, 1994

[54] MECHANICAL PLUG DEVICE

[75] Inventor: Bryan R. Benson, North Branch, Minn.

[73] Assignee: Cherne Industries Incorporated, Minneapolis, Minn.

[21] Appl. No.: 11,799

[22] Filed: Feb. 1, 1993

[51] Int. Cl.$^5$ .............................................. E21B 34/02
[52] U.S. Cl. ........................................ 166/92; 166/93; 166/97
[58] Field of Search ..................... 166/92–94, 166/97, 75.1, 79, 335–337, 368, 379

[56] References Cited

U.S. PATENT DOCUMENTS

| D. 329,686 | 7/1992 | Mathison et al. ............ D23/249 |
| D. 329,687 | 7/1992 | Benson et al. ............... D23/249 |
| 1,808,411 | 6/1931 | Hinkston . |
| 2,179,191 | 11/1939 | McWilliams ................... 166/92 |
| 3,722,549 | 3/1973 | Wilson et al. ................ 166/92 X |
| 4,411,312 | 10/1983 | English ........................ 166/75.1 |
| 4,493,344 | 1/1985 | Mathison et al. ............... 138/89 |
| 4,747,453 | 5/1988 | Howard ......................... 166/379 |
| 4,848,458 | 7/1989 | Holdsworth et al. ........... 166/92 |
| 4,881,597 | 11/1989 | Hensley ...................... 166/75.1 X |
| 4,971,149 | 11/1990 | Roberts ....................... 166/75.1 X |
| 5,184,608 | 2/1993 | Hale .............................. 166/93 X |
| 5,195,590 | 3/1993 | Kenner ........................ 166/379 |

OTHER PUBLICATIONS

Morrison Bros. Co., Dubuque, Iowa, Monitoring Well Specification Guide, Apr., 1989, pp. 1–3 and 6.

Primary Examiner—Roger J. Schoeppel
Attorney, Agent, or Firm—Anthony G. Eggink

[57] ABSTRACT

A well monitor plug device for sealing a subwell casing. The plug device has an adjustable and tamper resistant sealing structure which includes a turning member and a cooperating locking member which permits access to a sampling aperture.

18 Claims, 2 Drawing Sheets 5,348,085

1

MECHANICAL PLUG DEVICE

BACKGROUND OF THE INVENTION

The invention relates generally to a mechanical plug device and, particularly, to a well monitor plug device for sealing the exposed top of a subwell casing.

Environmental concerns relating to the integrity of underground storage tanks for containing various chemical products, such as petroleum products and the like, have resulted in federal and state laws which require the continuous monitoring of storage systems. For example, one monitoring system involves the placement of a non-permeable liner below and around an underground storage tank to contain possible leakage. A number of perforated subwell casings are placed within the confines of the lined area and by monitoring these casings the storage tank can periodically be sampled for leakage to, thereby, check its integrity.

Although various plug and sealing devices have been proposed and utilized for sealing the subwell casings of these monitoring systems, problems remain with providing an effective plug device which will ensure tamper resistance of the casing during periods of non-use and which will provide quick and efficient access to the casing for testing purposes. For example, existing plug devices used in the construction and plumbing industries have been used for sealing these subwell casings. However, these devices typically do not offer tamper resistance, nor do they provide an easy and efficient means to monitor the well without the removal of the entire plug device. The shortcomings and problems of these prior art devices have caused plug device parts to fall into the subwell casings and have caused these casings to be mistaken for tank fill pipes. It is an object of this invention to provide an effective well monitor plug device for sealing subwell casings.

The well monitor plug device of the present invention has structure which provides a unitary plug which provides for the tamper resistant sealing of subwell casings. The plug device of the invention permits the effective sealing of the subwell casing and provides means to effectively lock the device during periods of non-use and efficient means to permit the periodic sampling of the subwell.

SUMMARY OF THE INVENTION

The present invention provides a unitary well monitor plug device for sealing a subwell casing. The plug device has an upper plate member, a bottom plate member, an expandable 0-ring structure positioned between the upper and bottom plate members and a generally T-shaped bolt member to move the plate members with respect to each other. The T-shaped bolt member has opposing horizontally disposed ear members, one having a pivotable latch member mounted thereto. A vertically extending hollow and threaded cylinder is mounted between the opposing ear members and which threadingly engages the bottom plate member. The pivotable latch member is constructed and arranged to permit the plug device to be tightened and loosened when in the vertical position and to be locked in place with respect to the top plate member when in the horizontal position.

The well monitor plug device is further provided with a sampling port which permits a probe to be passed through the hollow cylinder of the T-shaped bolt member. Further, the pivotable latch member covers the sampling port when in the closed or horizontal position and permits access to the port when in the vertical position. Also provided by this invention is a well monitor plug device for sealing subwell casings to monitor the integrity of petroleum storage tanks.

These and other benefits of this invention will become clear from the following description by reference to the drawings.

DESCRIPTION OF THE PREFERRED EMBODIMENT

Figure 1:
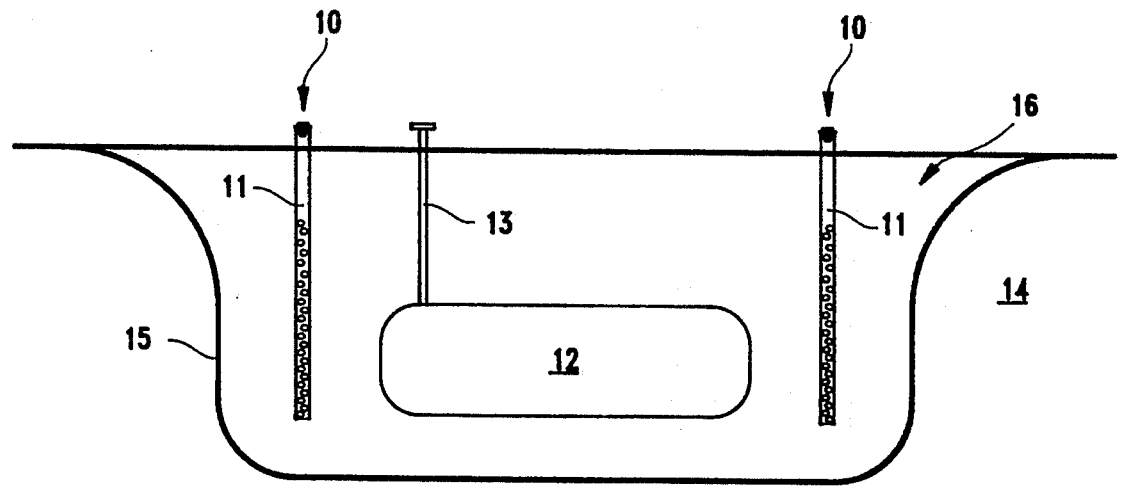
FIG. 1 is a lateral view showing the well monitor plug device of this invention in use in a monitoring system for an underground storage tank.

FIG. 1 shows the well monitor plug 10 of the present invention in use in a monitoring system for an underground storage tank 12. The plug devices 10 are shown positioned at the exposed upper ends of subwell casings 11 which extend downwardly into a confined space 16 defined by a non-permeable liner 15 positioned about storage tank 12 located under ground 14. As discussed above, underground tanks 12 for storing petroleum products and the like, are required under federal and state laws and regulations to be periodically tested for leakage. Any leakage caused by a corroded or defective fill pipe 13 or storage tank 12 is captured within the confined space 16 and therefore subject to detection via the perforated subwell casings 11.

The well monitor plugs 10 of the invention provide a tamper resistant means to seal the subwell casings 11 and provide a sampling access port therethrough without requiring the removal of the plugs 10 from the well casings. The plug 10 is further provided by means 35 to receive the clasp of a lock (not shown) for securing the plug in a sealing position and which provides quick and easy access to the sampling access port when the lock is removed.

Figure 2:
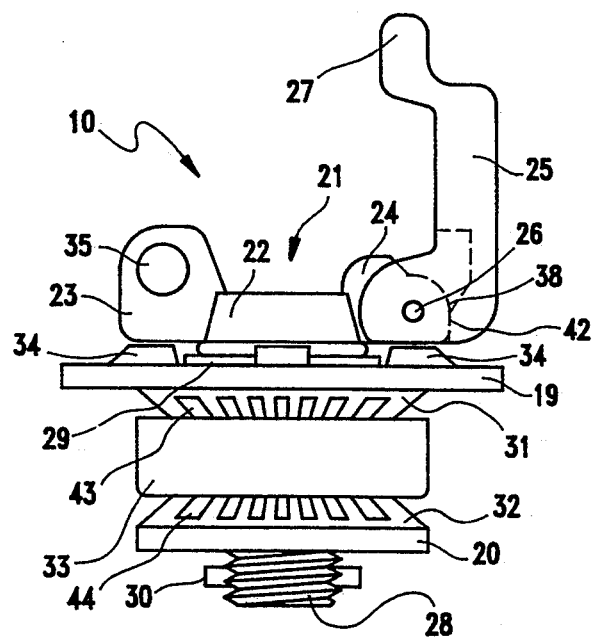
FIG. 2 is a lateral view showing the well monitor plug device.
Figure 3:
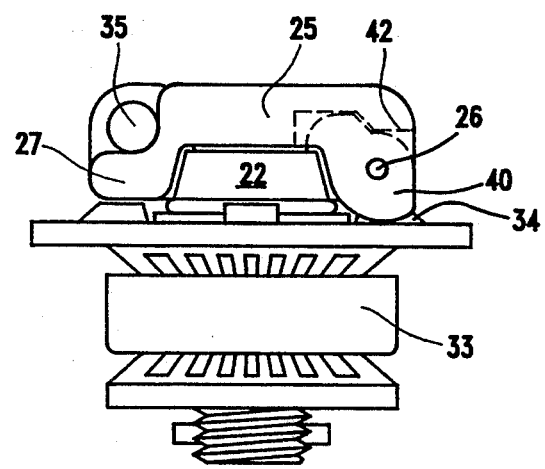
FIG. 3 is a lateral view showing the well monitor plug device of FIG. 2 in a closed position.
Figures 4, 5:
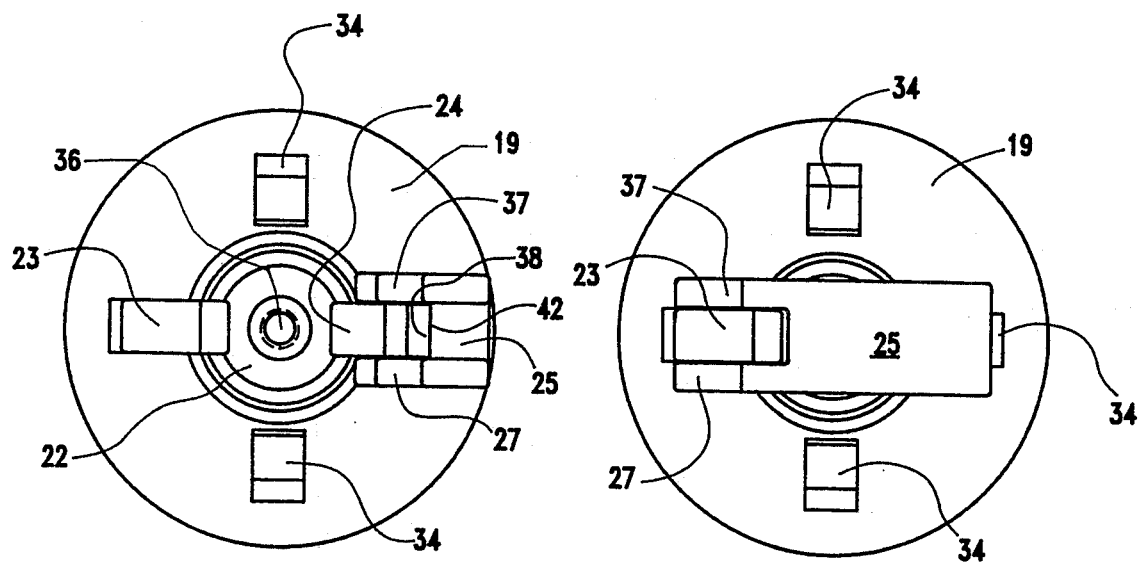
FIG. 4 is a top plan view showing the well monitor plug device of FIG. 2.
FIG. 5 is a top plan view showing the well monitor plug device of FIG. 3.

FIGS. 2, 3 and 5 show the well monitor plug 10 having top plate 19, bottom plate 20, each having a frustoconical ramp 31 and 32, respectively, between which 0-ring 33 is positioned. Both frustoconical ramps 31 and 32 are preferably provided with anti-rotational means 43 and 44 to engage the 0-ring 33 so as to prevent rotation of the bottom plate 20 when the T-shaped member 21 is rotated to seal or to remove the plug 10 from the subwell casing. The anti-rotational means 43 and 44 may be raised ribs on the ramps 31 and 32 which grasp the 0-ring 33 to thereby prevent relative rotation between the opposing plate members 19 and 20 and the 0-ring 33. The operation of the opposing plates 19 and 20 with respect to the 0-ring 33 is discussed in Applicant's Assignee's U.S. Pat. No. 4,493,344, entitled, "Mechanical Plug Device", which is incorporated by reference herein. In the present invention, however, a T-shaped locking member 21 is provided to operate the device structure in cooperation with an internally threaded axial aperture through bottom plate 20.

The T-shaped locking member 21 has an axially disposed cap portion 22 having an ear member 23 and an opposing ear member 24 extending therefrom. A pivotable latch and protection member 25 is mounted to ear member 24 by means of pivot pin 26. The latch member 25 is a generally U-shaped structure having bifurcated latch ends 27 and 37. Extending downwardly from the axial cap portion 22 is a threaded cylinder 28 which engages the internally threaded aperture of bottom plate 20. A stop pin 30 extends through the bottom of the threaded cylinder 28 to prevent the dismemberment of the plug device 10 during operation should the T-shaped member 21 be inadvertently loosened further than necessary. A low friction washer 29 is provided between the T-shaped member 21 and the top plate 19 for ease of operation purposes.

FIG. 2 shows the latch member 25 in an upward or unlocked position. As shown, the bottom portion of the member 25 is positioned above the stop member 34, thereby, permitting the locking member 21 to be rotated to operate the plug device 10. FIG. 3 shows the latch member 25 in a downward position whereby the bifurcated base members 40 and 41 straddle a stop member 34 to prevent further rotation of the locking member 21. As further shown in FIG. 6, an abutment surface 38 of ear member 24 is provided between the bifurcated base members 40 and 41 so that when the latch member 25 is pivoted about pin 26 into an upward positioned, the position shown in FIG. 2 is maintained for operation of the device. The abutment surface 38 of ear member 24 contacts the abutment surface 42 of latch 25 when the latch member 25 is pivoted in an upward position as shown in FIGS. 2 and 4.

Referring to FIG. 4, the upper face of top plate 19 is shown to have four equidistantly spaced stop members 34 mounted thereon, for example. Each stop member 34 has a specified height and width which cooperates with the configuration of the T-shaped member 21. The width of each stop member 34 is such so that the bifurcated base members 40 and 44 straddle a member 34 when the latch member 25 is in a downward position. Further, the distance between the radially disposed stop members 34 is also predetermined to also cooperate with the operation and function of the T-shaped member 21. The distance between each stop member 34 is such so that the outer edges of the bifurcated base members 40 and 41 lock between adjacent members 34 when the latch member 25 is in a downward position. This structure, therefore, permits eight locking positions of the latch member 25 when a top plate member 19 has four stop members 34.

Figures 6, 7:
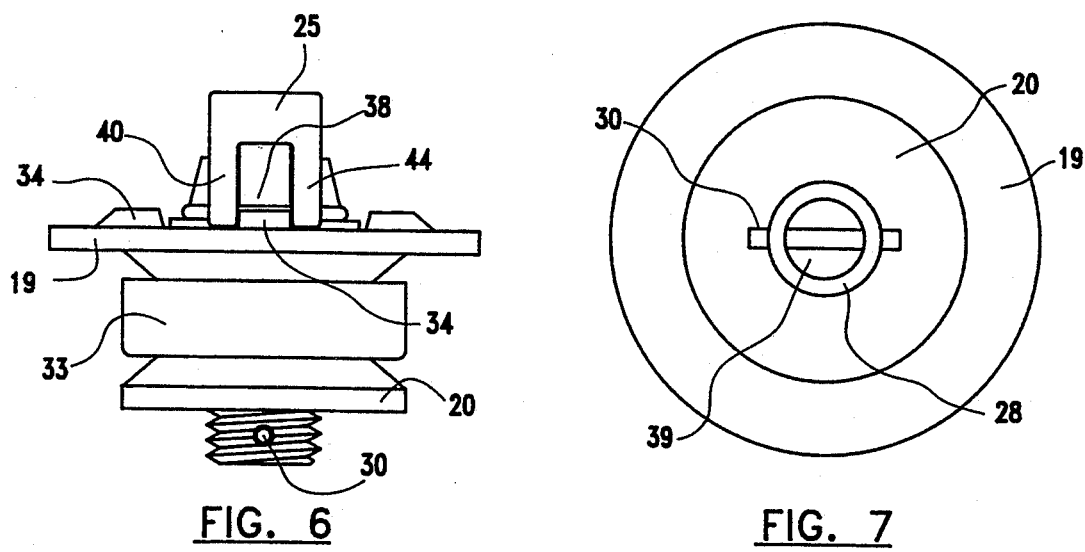
FIG. 6 is a rear view showing the well monitor plug of FIG. 3.
FIG. 7 is a bottom view showing the well monitor plug device of FIG. 2.

Further shown in FIG. 4, is a threaded plug 36 which protects the opening to the internal conduit or monitor port 39 passing through the threaded cylinder 28. The threaded plug 36 is not accessible when the latch member 25 is in a downward position. As shown in FIG. 7, the monitor port 39 provides passage of a monitoring probe into the subwell casing 11 without removal of the entire plug device 10. The monitor port 39 extends upwardly through the cylinder 28 and communicates through the center of cap 22 to where the plug 36 is removably inserted.

In summary, the well monitor plug of the invention has structure to sealingly secure a well casing and to provide a sampling access without requiring the removal of the plug. The plug is a unitary structure and is preferably molded of thermoplastic elements. The plug is comprised of upper and lower plates between which an expandible O-ring is positioned. A turning member having a locking member pivotally connected thereto is utilized to operate the plug and to expose a sampling aperture when in an upward position. The locking or latch member cooperates with stop members disposed on the upper plate to secure the plug in a plurality of positions and to cover and protect the sampling aperture during periods of non-use.

As many changes are possible to the embodiments of this invention utilizing the teachings thereof, the descriptions above, and the accompanying drawings should be interpreted in the illustrative and not the limited sense.

What is claimed is:

1. A unitary well monitor plug device for sealing a subwell casing comprising:
   a) an upper plate member having a top portion and a bottom portion and an aperture therethrough, a plurality of stop members positioned on said top portion and being spaced from said aperture and a frustoconical ramp member extending from said bottom portion,
   b) a bottom plate member having a threaded aperture therethrough and having an upwardly extending frustoconical ramp member,
   c) an expandable O-ring having an outwardly extending peripheral sealing surface and an inwardly extending generally V-shaped inner surface for slidingly engaging said frustoconical ramp members of said upper and bottom plate members, and
   d) a generally T-shaped bolt member having a horizontally extending top member and a vertically extending hollow threaded cylinder for passing through said upper plate member aperture and for threadingly engaging said bottom plate member threaded aperture, said hollow threaded cylinder further having a bottom end having stop means extending outwardly therefrom, said horizontally extending top member further comprising:
   i) an axially disposed cap member mounted to said hollow threaded cylinder and having a monitor port therethrough for communication with said hollow threaded cylinder and further having removable plug means in said cap member monitor port,
   ii) first and second outwardly extending and aligned ear members mounted to said cap member,
   iii) said first ear member having an aperture therethrough being axially disposed spacially parallel to said upper plate member top portion, and
   iv) said second ear member having a latch member with a bifurcated base portion pivotably mounted thereto, said latch member having a downwardly extending bifurcated frontal portion having first and second outwardly extending members constructed and arranged to rest on said cap member and to extend adjacent and below said aperture of said first ear member when said latch member is pivoted in a downward configuration, said bifurcated base portion being constructed and arranged to straddle a stop member or to be positioned between adjacent stop members when said latch member is in a downward configuration.

2. The well monitor plug device of claim 1, wherein said upper plate member, said bottom plate member and said T-shaped bolt member are constructed of a molded plastic material.

3. The well monitor plug device of claim 1, wherein said removable plug means in said cap monitor port is a threaded screw.

4. The well monitor plug device of claim 1, wherein said upper plate member has a plurality of stop members thereon and wherein said stop members and said first and second outwardly extending and aligned ear members of said cap member have generally the same width.

5. The well monitor plug device of claim 1, wherein said second ear member bifurcated base portion has opposing downwardly extending portions to straddle said stop member for locking said latch member in place.

6. The well monitor plug device of claim 1, wherein said device is constructed of a petroleum resistant material.

7. The well monitor plug device of claim 1, wherein said bifurcated latch member base portion is constructed and arranged to maintain a generally vertical position when pivoted upwardly and wherein said stop members have a height to provide sufficient clearance for said first and second ear members and said latch member when in the vertical position.

8. The well monitor plug device of claim 1, wherein said bifurcated latch member base portion has a centrally disposed rear bottom surface for abutting a stop member to maintain said generally vertical position.

9. The well monitor plug device of claim 1, wherein said latch member has a width less than the spacing between the stop members on said upper plate top portion.

10. The well monitor plug device of claim 1, wherein said frustoconical ramp members of said upper and bottom plate members are provided with anti-rotational means for engaging said O-ring.

11. A well monitor plug device to secure a well casing and to provide sampling access into the well casing, comprising:
a) an adjustable unitary sealing means having an upper plate structure,
b) a sampling aperture in said upper plate structure and having removable plug means in said sampling aperture of said upper plate structure,
c) a turning member extending axially and upwardly from said upper plate structure and being constructed and arranged to adjust said sealing means and to cover said sampling aperture,
d) a locking member connected to said turning member and being constructed and arranged to pivot into an upward position to provide access to said sampling aperture and to permit rotation of said turning member, said locking member further having means to receive and clasp of a lock when in a downward position, said locking member further having a bifurcated downwardly sloping forward structure and an aligned bifurcated bottom structure of a specified width, said bifurcated bottom structure further having opposing downwardly extending portions being spaced a predetermined distance, and
e) a plurality of equidistantly spaced stop members each having a specified width extending from said upper plate structure and being adapted to prevent rotation of said turning member when said locking member is in a downward position, said specified width of said bifurcated bottom structure of said locking member being less than the equidistantly spaced stop members spacing distance and said predetermined distance between said downwardly extending portions of said bifurcated bottom structure being greater than said stop member specified width, whereby said locking member may be positioned to straddle a stop member or placed between adjacent stop members.

12. The well monitor plug device of claim 11, wherein said turning member includes an ear member with an aperture and being aligned with said bifurcated forward structure of said locking member.

13. The well monitor plug device of claim 12, wherein said turning member includes a cap structure having a threaded conduit connected thereto and having said sampling aperture extending through said threaded conduit and wherein said removable sealing means is a threaded screw.

14. The well monitor plug device of claim 13, wherein said adjustable unitary sealing means includes a bottom plate and an expandable O-ring structure positioned between said bottom plate and said upper plate structure.

15. The well monitor plug device of claim 14, wherein said bottom plate and said upper plate structure are molded of a thermoplastic material.

16. The well monitor plug device of claim 15, wherein said bottom plate has a centrally disposed threaded aperture and wherein said threaded conduit has a length and an end to extend through said bottom plate and wherein a pin extends through the end of said threaded conduit.

17. The well monitor plug device of claim 16, wherein said upper plate structure and said bottom plate have opposing frustoconical portions with upwardly disposed anti-rotation members.

18. The well monitor plug device of claim 17, wherein said O-ring structure has an inwardly disposed V-shaped periphery.

* * * * *